(12) United States Patent
Cheung

(10) Patent No.: US 7,976,790 B2
(45) Date of Patent: Jul. 12, 2011

(54) METHOD AND APPARATUS FOR THE EXTRACTION OF PLANT CONSTITUENTS

(76) Inventor: Vasco Cheung, Kowloon (HK)

( * ) Notice: Subject to any disclaimer, the term of this patent is extended or adjusted under 35 U.S.C. 154(b) by 1211 days.

(21) Appl. No.: 11/033,477

(22) Filed: Jan. 12, 2005

(65) Prior Publication Data

US 2006/0153758 A1   Jul. 13, 2006

(51) Int. Cl.
  *B01D 1/00* (2006.01)
  *B01D 3/00* (2006.01)
  *B01D 17/00* (2006.01)
  B01D 11/02 (2006.01)
  B01D 12/00 (2006.01)
  B01D 15/00 (2006.01)
  B01J 19/00 (2006.01)
  A61L 2/00 (2006.01)

(52) U.S. Cl. ........ 422/285; 422/261; 422/281; 422/287; 422/291; 422/21

(58) Field of Classification Search .......... 422/285, 422/308, 287, 908, 281, 21, 261, 291
See application file for complete search history.

(56) References Cited

U.S. PATENT DOCUMENTS

| 2,953,457 | A | * | 9/1960 | Sanna | 426/242 |
| 3,616,375 | A | * | 10/1971 | Inoue | 204/157.61 |
| 3,721,013 | A | * | 3/1973 | Miller | 34/265 |
| 4,013,558 | A | * | 3/1977 | Rosenberg | 210/149 |
| 4,631,380 | A | * | 12/1986 | Tran | 219/697 |
| 6,581,299 | B1 | * | 6/2003 | Dedieu et al. | 34/259 |
| 6,863,805 | B1 | * | 3/2005 | Barreras et al. | 210/143 |
| 6,955,753 | B1 | * | 10/2005 | Gomez | 208/252 |
| 2004/0182855 | A1 | * | 9/2004 | Centanni | 219/628 |
| 2005/0139594 | A1 | * | 6/2005 | Jones et al. | 219/687 |
| 2005/0260096 | A1 | * | 11/2005 | Voyten et al. | 422/21 |

FOREIGN PATENT DOCUMENTS

| CA | 2005390 | 7/1990 |
| EP | 0985416 | 3/2000 |
| RU | 2126824 | 2/1999 |
| WO | WO 97/18283 | 5/1997 |

* cited by examiner

*Primary Examiner* — Sean E. Conle
*Assistant Examiner* — Regina Yoo
(74) *Attorney, Agent, or Firm* — Jacobson Holman PLLC

(57) ABSTRACT

An apparatus for the extraction of plant constituents such as may be used in the production of traditional Chinese medicines. The apparatus uses a fluid chamber to hold a mixture of plant and carrier fluid which is then passed through a conduit through a second chamber. The second chamber includes microwave sources to heat the mixture and preferably, some mechanical mechanisms to create turbulence to assist in breaking cell walls within the plant material. The heated mixture is returned to the fluid chamber and the process continued on further fluid and plant mixture until the batch itself is at elevated temperature and retained for a predetermined period of time. The resultant mixture may then be processed through a microwave assisted condensation process to provide a condense extract for eventual use.

3 Claims, 2 Drawing Sheets

METHOD AND APPARATUS FOR THE EXTRACTION OF PLANT CONSTITUENTS

FIELD OF THE INVENTION

This invention relates to a method and apparatus for the extraction of plant constituents and, in particular, although not necessarily solely, extraction of such constituents as may be used in traditional medicine.

BACKGROUND TO THE INVENTION

Traditional medicine has, for centuries, utilized medicinal products of various herbs and other plants either on their own or in combination with others.

Traditionally, medications made from such plants may involve the process of slowly heating the plant material in a suitable carrier liquid such as water or alcohol so as to break down the plant material to form a drink or a liquid for direct application or, upon drying, a powder or similar. Such traditional methods have generally been performed by small practitioners employing household apparatus such as pots or similar vessels for the slow heating of the plant material and carrier liquid.

By contrast, other organizations such as existing pharmaceutical companies have analyzed plant materials to try and ascertain particular active constituents within the plant and rely on either complex processing to extract that particular active compound or the production of generic equivalents of that compound. In some instances, medications made from single active compounds may not be effective in the eyes of those pursuing more traditional methods as it removes the opportunity of synergy with other constituents of the plant or constituents within a mixture of plants.

The commercial scale production of traditional medicines has not always proved to be economic. The up scaling of small scale boiling of individual preparations to large scale apparatus utilizes a large amount of energy in the heating operation to the extent that some products may no longer prove economically viable for such large scale production.

OBJECT OF THE INVENTION

It is an object of the present invention to provide method and apparatus for the extraction of plant constituents that may provide a relatively economic production while still ensuring a reasonable yield from the plant materials themselves or, at a minimum, at least provide the public with a useful choice.

SUMMARY OF THE INVENTION

Accordingly, in the first aspect, the invention may broadly be said to consist in an apparatus for the extraction of plant constituents comprising:
 a fluid chamber for the retention of plant material in a suitable carrier fluid;
 a fluid pathway from said fluid chamber through a second chamber returning to said fluid chamber; and
 wherein said second chamber includes at least one source of microwaves to heat fluid passing through said fluid pathway prior to returning to said fluid chamber.

Preferably said second chamber includes a plurality of microwave sources arranged in an array.

Preferably said fluid pathway comprises a convoluted conduit through said second chamber.

Preferably said fluid pathway includes at least one means to create turbulence in the fluid flow.

Preferably said means to create turbulence in said fluid flow comprises a turbulent flow creating chamber in the form of an expansion chamber.

Preferably said fluid is driven through said fluid pathway by at least one pump.

Preferably said mixture of plant material and carrier fluid in said fluid chamber is circulated through said fluid pathway for heating such that heated fluid is retained in said fluid chamber at an elevated temperature for a predetermined period of time.

Preferably said apparatus further includes control means for controlling the fluid flow through the pathway and retention in said fluid chamber.

Accordingly, in a second aspect, the invention may broadly be said to consist in a method of extracting plant constituents comprising the steps of:
 providing a mixture of plant material and carrier fluid in a fluid chamber;
 passing fluid from said fluid chamber through a fluid pathway and returning it to said fluid chamber;
 subjecting fluid passing through said fluid pathway to at least one source of microwaves to heat said fluid; and
 retaining said fluid in said fluid chamber with an elevated temperature for a predetermined period of time.

Preferably said method includes the step of applying turbulence to said fluid passing through said fluid pathway.

Accordingly, in a third aspect, the invention may broadly be said to consist in an apparatus for the condensing of a fluid containing plant constituents in a carrier fluid including the following:
 at least one primary evaporation chamber having an inlet for receiving a mixture of plant constituents and carrier liquid;
 at least one steam outlet for the outlet of evaporated liquid and at least one further outlet for the outlet of condensed liquid;
 a fluid pathway from said outlet for said condensed liquid to a plurality of secondary evaporation chambers;
 a plurality of microwave sources acting upon said secondary evaporation chambers;
 outlets for condensed liquid from said secondary evaporation chambers;
 at least one fluid control means to control the flow of fluid from said secondary chambers to a single outlet or returning fluid to said first evaporation chamber for further processing; and
 at least one sensing means to sense a parameter of said fluid to control said control means.

Accordingly, in a fourth aspect, the invention may broadly be said to consist in a method of condensing a fluid containing plant constituents in a carrier fluid comprising the steps as follows:
 passing said fluid into a first evaporation chamber for the extraction of evaporated fluid and the collection and outlet of condensed fluid;
 passing said condensed fluid through a plurality of secondary evaporation chambers for the further extraction of evaporated fluid and collection of further condensed fluid;
 subjecting said secondary evaporation chambers to microwaves to heat fluid within said secondary chambers;
 sensing a parameter of the further condensed fluid from said secondary evaporation chambers; and
 passing said further condensed fluid from said secondary chambers either to said primary evaporation chamber or to a final outlet in accordance with said sensed parameter of said further condensed fluid.

BRIEF DESCRIPTION OF THE DRAWINGS

Preferred embodiments of the invention will now be described with reference to the following drawings in which.

DETAILED DESCRIPTION OF PREFERRED EMBODIMENTS

This invention relates to methods and apparatus for the extraction of plant constituents such as those as may be used in traditional Chinese medicine or other herbal or plant based preparations.

Figure 1:
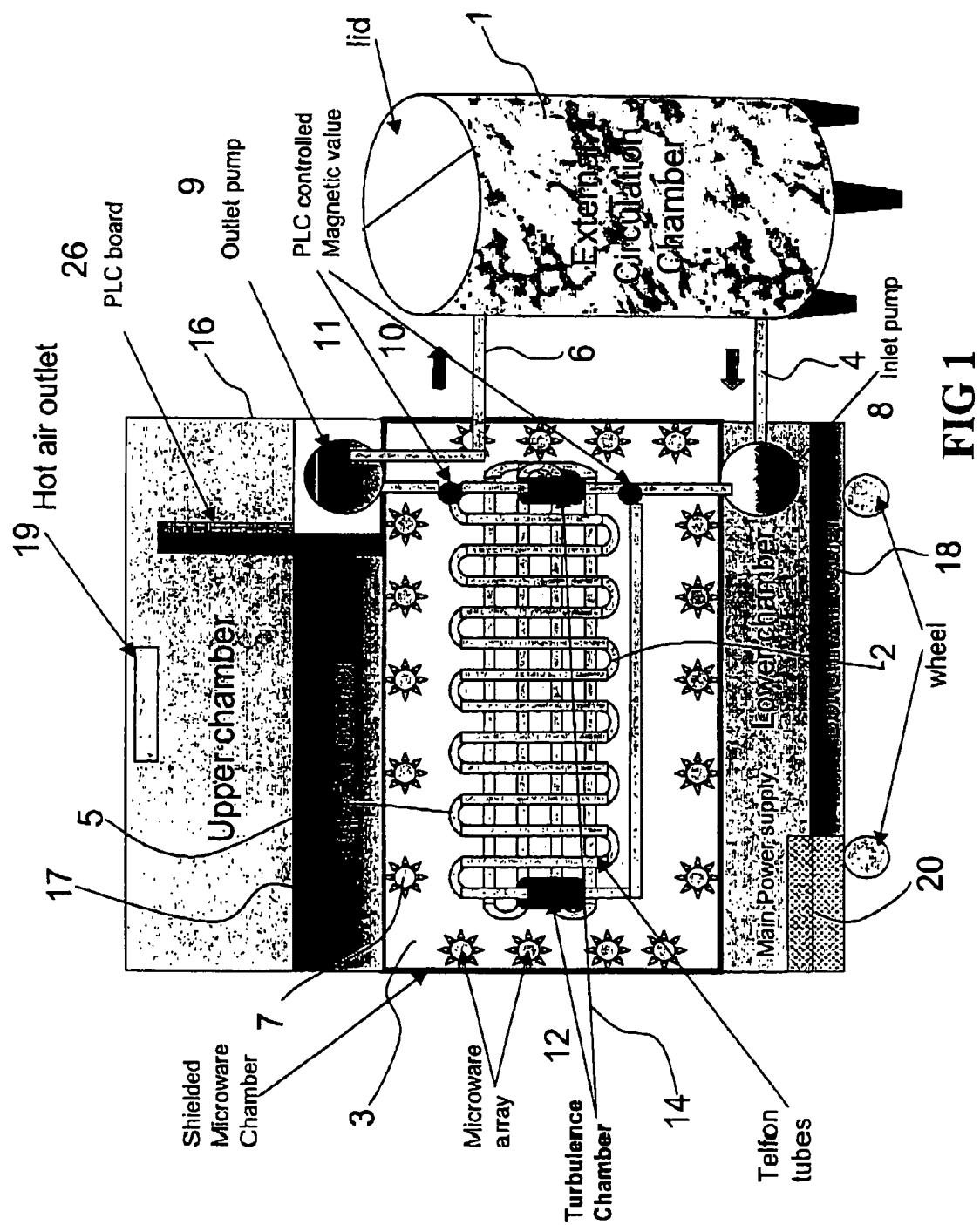
FIG. 1 is a schematic view of an extraction apparatus in accordance with a first embodiment of the invention.

Referring to FIG. 1, a preferred embodiment of the invention is shown to include a fluid chamber 1 in which, typically, plant material would be provided in a carrier fluid such as water, alcohol or such other carrier fluid as may be desired to receive a plant constituent. In general, an apparatus as described will be in reference to a batch processing operation although it will be appreciated that a continuous processing operation may be possible with suitable adaptation.

The fluid chamber 1 is intended to hold the initial starting materials as well as act as a retention chamber throughout the process.

The fluid chamber 1 is connected to a fluid pathway 2 which circulates out through a heating chamber 3 prior to return to the fluid chamber 1. The fluid pathway 2 can be seen to comprise an outlet 4 from the fluid chamber 1, a convoluted pathway 5 through the heating chamber 3 and a return path 6 as an inlet to the fluid chamber 1.

The secondary chamber 3 through which the fluid pathway 2 progresses includes means to heat the fluid within the pathway in the form of at least one source of microwaves 7. In fact, microwaves are emitted by a plurality of sources of microwaves arranged in an array around a convoluted conduit 5 forming part of the fluid pathway 2.

Typically, to circulate fluid through the fluid pathway 2, at least one driving means in the form of a pump, turbine or similar may be provided. In the preferred embodiment as shown in FIG. 1, both an inlet pump and an outlet pump 8 and 9 respectively are provided with separately control valves 10 and 11 to control the flow of fluid into and out of the convoluted conduit 5 within the heating chamber 3.

The purpose of this extraction apparatus is to endeavour to break down the cell structure of the plant material such that important constituents within the cells may be released into the carrier fluid for increased activation. In doing so, the apparatus endeavours to heat the fluid and maintain the fluid in a heated state for a predetermined period of time to allow for the release of those constituents into the carrier fluid. In addition to providing microwave sources to provide heat to the fluid, this preferred form of the invention may provide additional mechanical mechanisms to increase the opening of the cell walls so as to increase the yield from the plant material or shorten the processing time.

Referring to the preferred embodiment as shown in FIG. 1, the mechanical means of extraction comprise at least one means for creating turbulence 12 which, in this preferred embodiment, is provided as a pair of turbulence creating chambers within the fluid pathway. The creation of turbulence into the fluid flow may cause additional rupture of the cell walls so as to increase the yield.

In this embodiment, the turbulence chambers 12 and 14 provided as expansion chambers in the convoluted conduit 5. Pressurized fluid under the action of the inlet or outlet pumps and travelling within a confined conduit will reach the expansion chambers and turn into non-linear flow conditions within the chamber.

Although not included in this preferred embodiment, additional mechanisms such as introduction of ultrasound vibration may also be used to educate or disrupt the cell walls and may also be included in the processing chamber 3.

In operation, a portion of the fluid held within the fluid chamber 1 may be drawn by the inlet pump 8 into the convoluted conduit pass the controlled valve 10. Once within the conduit, the fluid is subjected to microwaves to heat the fluid as well as turbulent action within the expansion chambers 12 and 14 prior to passing through the outlet pump 9 back into the fluid chamber 1. It should be noted that only a portion of the plant material and fluid within the fluid chamber 1 is passed through the heating chamber 3 at any particular time. Through continued circulation, it will be appreciated that the fluid and plant mixture within the fluid chamber 1 will raise in temperature as portions of the mixture are heated within the chamber 3. The specific desired temperature for release of the constituents and the retention time necessary to obtain a suitable yield may vary with different mixtures. However, a typical process may use the heating chamber 3 to raise the temperature of the fluid held within the fluid chamber 1 to approximately 80° C. and maintain that temperature for at least 20 minutes. At that stage, the fluid within the fluid chamber 1 may have received a reasonable portion of the constituents from the plant material into the carrier fluid.

As shown in FIG. 1, the apparatus itself may use an external chamber 1 as the fluid chamber and the heating chamber 3 may be provided in a sealed chamber to avoid the transmission of microwaves out of the chamber itself. The conduit 5 within the microwave chamber may be made from suitable materials to allow passage of the fluid while maximising utilisation of the microwave energy. Conduit from Teflon or PTFE or other microwave safe materials may be suitable.

A sealed microwave chamber 3 may be contained within a larger housing 16 so as to facilitate ancillary apparatus. The ancillary apparatus may include the pumps 8 and 9 as well as regions 17 and 18 for cooling of air about the sealed microwave chamber so as to minimize heat transmission to the outer housing 16. A hotter outlet 19 may also be provided on the apparatus for removal of excess heat.

A power supply 20 may be provided for both the microwave sources as well as the pumps and other ancillary apparatus.

Furthermore, this preferred embodiment may include a control means 21 in the form of a PLC board or similar to control the process.

Although not shown in this preferred embodiment, sensors in the form of temperature sensors or similar may be provided to give data on the conditions of the fluid within the fluid chamber 1 and/or the convoluted conduit 5 so as to monitor the progress of the operation and control the pumps 8 and 9 as well as the valves 10 and 11 to provide an overall process control.

The apparatus discussed thus far provides a fluid in which many of the plant constituents are released into the fluid. However, for easier processing into the final products, it may be desirable to further condense the resultant fluid. An apparatus for performing this portion of the process is desired. This may be used to produce a thickened liquid that may be dried to granules or used in the making of tablets or similar.

Figure 2:
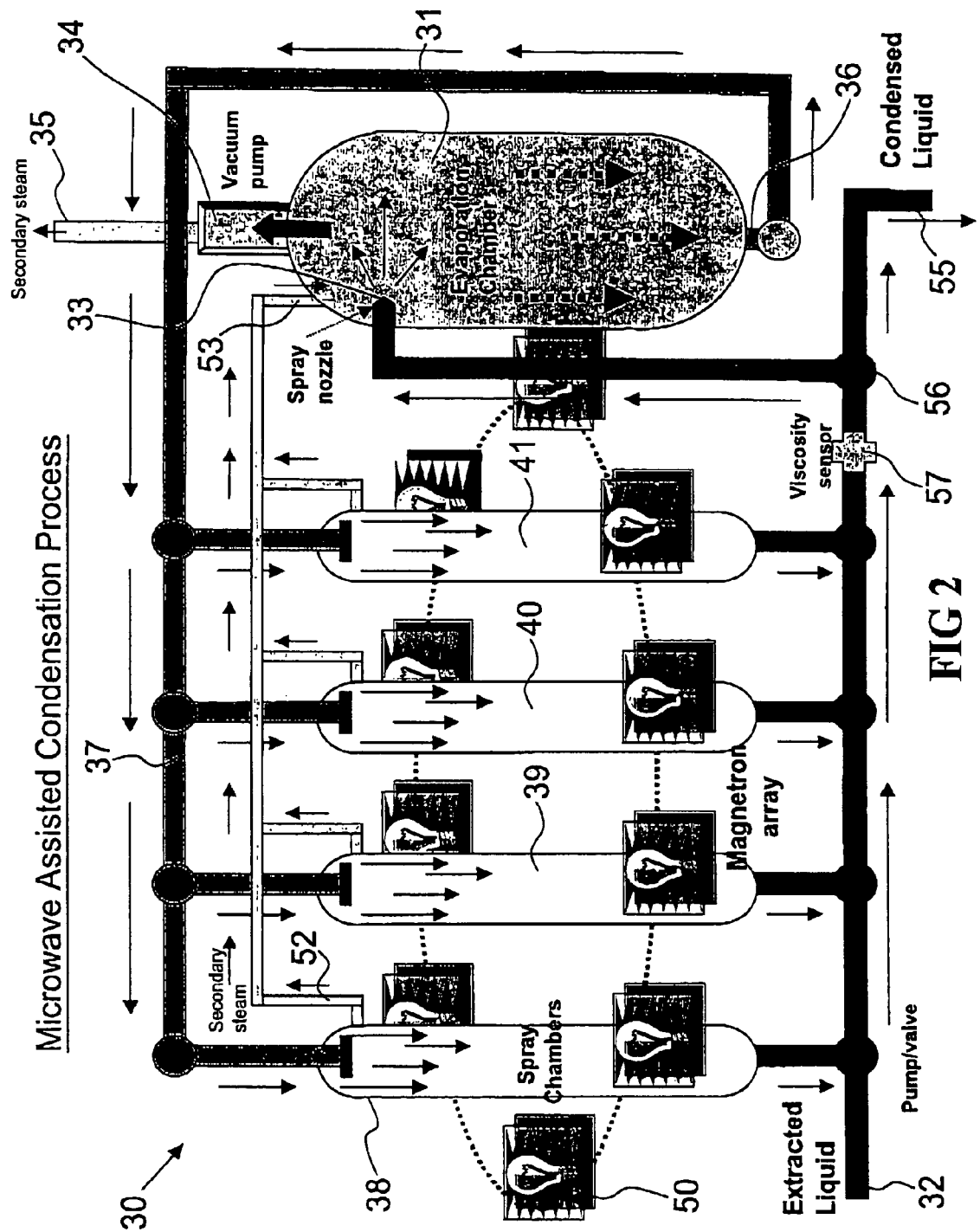
FIG. 2 is a schematic view of a condensing apparatus in accordance with a preferred embodiment of the invention.

Condensing apparatus 30 is shown in FIG. 2. The apparatus 30 may comprise a primary evaporation chamber 31 into which liquid from an apparatus such as that in FIG. 1 may be supplied through a conduit 32.

The primary evaporation chamber 31 does not utilize heat but mere expansion of the pressurized fluid within the conduit 32 into a large chamber 31 through a spring nozzle 33. Such expansion will allow portion of the carrier fluid to convert into a gas phase as steam or similar be drawn off from the evaporation chamber 31 through a vacuum pump 34 to an outlet 35.

It is highly unlikely that a single pass through evaporation chamber 31 will provide sufficient condensing of the fluid. Therefore, an outlet 36 from the primary evaporation chamber 31 may pass the liquid through a further conduit 37 into one or more of a plurality of secondary spray chambers (38, 39, 40 and 41).

Preferably, each secondary evaporation chamber comprises a further expansion chamber in which the liquid may be introduced near the top of the chamber so as to expand into the chamber and run down under the effective gravity along the walls of the chamber. Furthermore, the secondary chambers may be arranged in a region under the influence of microwaves so as to add heat to the fluid. Preferably, a plurality of relatively low power microwave sources 50 may be arranged in an array around the secondary chambers to heat to the condensation process. The introduction of heat under expansion into the secondary chambers may release additional evaporated fluid in the form of steam within the secondary chambers which may be released through outlets 52 near the top of each of the secondary chambers. The outlets 52 may be passed directly to exhaust themselves or, in this preferred form, pass into the top of the primary evaporation chamber 31. Such steam may add some additional heat to the primary chamber 31 and by introducing the steam near the top of the primary chamber 31 at inlet 53, the steam itself is unlikely to interact significantly with the fluid introduced to the evaporation chamber but instead be drawn directly out through the vacuum pump 34.

The condensation apparatus may be provided as a continuous process or as a batch process. Multiple passes through the primary and secondary evaporation chambers are possible as the outlets from the secondary chambers 38, 39, 40 and 41 are passed back into the inlet conduit 32 towards the primary chamber 31.

The conduit at any point throughout the pathway may include a final outlet 55 accessed by the fluid through a valve 56 which itself may be controlled by a sensing apparatus 57. A sensing apparatus may sense a parameter of the fluid which provides an indication of the fluid being sufficiently condensed for an end of the condensation process. In this preferred embodiment, a viscosity sensor 57 is used which, once the fluid reaches efficient viscosity, opens valve 56 to allow fluid pass to the final outlet 55 rather than return to the primary evaporation chamber 31.

Thus it can be seen that this invention provides method and apparatus for the extraction of plant constituents into a carrier fluid and the further condensing of that fluid into a useful preparation. The method and apparatus rely on the use of microwaves as the principal heat source to improve energy efficiency was still providing attention to allow sufficient processing time in the extraction process. Furthermore, the introduction of secondary extraction processors such as turbulence, ultrasound or similar may be included.

The invention claimed is:

1. An apparatus for the extraction of plant constituents comprising:
   a fluid chamber for the retention of plant material in a suitable carrier fluid;
   a fluid pathway from said fluid chamber through a second chamber returning to said fluid chamber, said fluid pathway including a convoluted conduit through said second chamber;
   said second chamber including a plurality of microwave sources arranged in an array around said convoluted conduit to heat fluid passing through said convoluted conduit of said fluid pathway prior to returning to said fluid chamber such that said heated fluid is retained in said fluid chamber at an elevated temperature for a predetermined period of time; and
   at least one turbulent flow creating chamber in the form of an expansion chamber in said convoluted conduit of said fluid pathway in said second chamber to create turbulent flow to said fluid passing through said convoluted conduit of said fluid pathway in said second chamber so as to increase opening of cell walls of the plant materials and to release the plant constituents into said fluid; and
   control means for controlling the fluid flow through the pathway and retention in said fluid chamber such that, at any particular time, only a portion of the plant material and fluid within the fluid chamber is passed through the second chamber.

2. The apparatus for the extraction of plant constituents as claimed in claim 1, wherein said fluid pathway includes a convoluted conduit through said second chamber.

3. The apparatus for the extraction of plant constituents as claimed in claim 1, wherein at least one pump drives said fluid through said fluid pathway.

* * * * *